(12) United States Patent
McIlvaine (10) Patent No.: US 12,516,659 B2
(45) Date of Patent: Jan. 6, 2026

(54) NO FUNNEL HOUSING WIND TURBINE

(71) Applicant: Clifford J. McIlvaine, St. Charles, IL (US)

(72) Inventor: Clifford J. McIlvaine, St. Charles, IL (US)

( * ) Notice: Subject to any disclaimer, the term of this patent is extended or adjusted under 35 U.S.C. 154(b) by 0 days.

(21) Appl. No.: 19/095,672

(22) Filed: Mar. 31, 2025

(65) Prior Publication Data

US 2025/0230802 A1    Jul. 17, 2025

(51) Int. Cl.
| | | |
|---|---|---|
| *F03D 3/04* | (2006.01) | |
| *F03D 1/04* | (2006.01) | |
| *F03D 15/00* | (2016.01) | |
| *F03D 80/00* | (2016.01) | |
| *F03G 3/08* | (2006.01) | |

(52) U.S. Cl.
CPC ............... *F03G 3/08* (2013.01); *F03D 1/04* (2013.01); *F03D 15/00* (2016.05); *F03D 80/004* (2023.08); *F05B 2260/40* (2013.01)

(58) Field of Classification Search
CPC ... F03G 3/08; F03D 1/04; F03D 15/00; F03D 80/004; F03D 3/04; F03D 3/0472; F03D 3/0436; F03D 3/0454; F03D 3/0463; F03D 3/0481; F03D 3/049; F05B 2260/40
See application file for complete search history.

(56) References Cited

U.S. PATENT DOCUMENTS

| | | | | |
|---|---|---|---|---|
| 1,315,595 | A * | 9/1919 | Clark | F03D 80/70 244/103 S |
| 1,607,317 | A * | 11/1926 | Spencer | F03D 3/0454 415/905 |
| 4,279,569 | A * | 7/1981 | Harloff | F01D 1/14 415/53.3 |
| 4,457,666 | A * | 7/1984 | Selman, Jr. | F03D 3/0481 415/203 |
| 5,083,899 | A * | 1/1992 | Koch | F03D 3/049 415/4.2 |
| 7,605,491 | B1 * | 10/2009 | Chung | F03D 9/25 290/55 |
| 8,052,372 | B1 * | 11/2011 | Dvorak | F03D 3/0454 415/2.1 |
| 9,068,557 | B1 * | 6/2015 | Garrett | F03D 3/0463 |
| 9,273,665 | B1 * | 3/2016 | Krippene | F03D 3/005 |
| 2012/0141252 | A1 * | 6/2012 | Dvorak | F03D 3/0454 415/227 |

(Continued)

*Primary Examiner* — Nathaniel E Wiehe
*Assistant Examiner* — Joshua R Beebe
(74) *Attorney, Agent, or Firm* — BUCHANAN INGERSOLL & ROONEY PC (57) ABSTRACT

A fluid stream turbine includes a flywheel rotatably mounted to a central axis post and having a plurality of curved blades, and a housing rotatable mounted to the central axis post, the housing including a side wall configured to cover a portion of a radial periphery of the flywheel, a top wall configured to cover a portion of a top side of the flywheel, a rudder disposed on the top wall and configured to cause the housing to rotate such that a front of the housing always faces directly into a fluid stream, a first diverter scoop disposed at the front of the housing and configured to direct a first portion of the fluid stream toward the plurality of curved blades, and a second diverter scoop disposed at a rear of the housing and configured to direct a second portion of the fluid stream toward the plurality of curved blades.

36 Claims, 6 Drawing Sheets

(56) References Cited

U.S. PATENT DOCUMENTS

2013/0307276 A1* 11/2013 Ko ............................ F03D 3/02
                                                        290/55
2017/0130697 A1*  5/2017 Huang ..................... F03D 3/005

* cited by examiner

NO FUNNEL HOUSING WIND TURBINE

CROSS REFERENCE TO RELATED APPLICATIONS

The present application is a continuation-in-part of U.S. patent application Ser. No. 18/668,723 which was filed on May 20, 2024. U.S. patent application Ser. No. 18/668,723 is a continuation-in-part of U.S. patent application Ser. No. 18/178,699, which was filed on Mar. 6, 2023. The entire contents of U.S. patent application Ser. No. 18/178,699 and U.S. patent application Ser. No. 18/668,723 is incorporated herein by reference.

FIELD OF THE INVENTION

The present invention relates generally to no funnel housing fluid stream turbine devices which collect and convert fluid stream energy into usable electrical and mechanical energy.

BACKGROUND

Over the years, a number of approaches have been taken around the world to produce large amounts of clean, low cost pollution-free electrical and mechanical energy around the world, in all environmental conditions, to reduce and/or eliminate the use of dirty fossil fuels which are known to cause pollution and health problems. Such approaches have not fully solved the problems of collecting and converting wind, water, and solar energies into usable electrical and mechanical energies.

There is a need for simple, reliable, pollution free, environmentally safe energy collection and conversion systems, that can retrofit and replace the many old and broken three bladed prop generator units around the world that have failed, and that can generate more energy output for given size than the current three bladed props.

SUMMARY

Devices according to the present application are generally variations of single and twin turbine fluid stream energy collection and conversion devices. The devices utilize a horizontally mounted wheel with special curved, tall narrow large surface area blades which extend past the outer surface of the wheel. The special curved blades are configured to collect fluid stream energy from 360 degrees around the wheel without a funnel or housing to direct the wind or water into the blades. Such a wind turbine or tidal turbine is scaleable from one foot in diameter to several hundred feet in diameter.

The greater radial diameter the wheel is, the more efficient it becomes by taking advantage of the larger centripetal force and very heavy mass of material built into the outer one third of the wheel and blades. This very heavy mass acts as a flywheel which automatically stores and releases a large amount of mechanical energy, which stabilizes the speed and orientation of the wheel by using its precession effect. It also transfers a large amount of kinetic energy down to the center rotational axis pivot point, where the mechanical power take-off points are located, and which contributes substantial mechanical force at the inner wheel hub.

The wind turbine can be disposed at any height from several feet off the ground to several hundred feet above the ground. The turbine can automatically collect fluid stream energy from any direction 360 degrees around the torus wheel without using a funnel or housing. Exemplary embodiments of the wind turbine utilize a wind blocker/rudder/diverter scoop assembly which greatly improves the wheel's efficiency and can help the environment even more by greatly mitigating and almost eliminating bird fatalities as compared to the three bladed prop units.

The wind turbine is easy to build and mass produce with common "off the shelf" materials available today. Lightweight materials such as aluminum, carbon fiber, fiberglass, and their equivalents may be used, resulting in lower efficiency. High mass density materials such as concrete, lead, stainless steel, cast iron, glass or similar materials may be used for increased efficiency to store and release large amounts of mechanical energy.

DETAILED DESCRIPTION

Set forth below with reference to the accompanying drawings is a detailed description of exemplary embodiments of no funnel housing fluid stream conversion devices.

Exemplary embodiments comprise a horizontal heavy mass flywheel with numerous large curved surface area collection blades at the outer edge of the wheel. Each of these tall large surface area curved fluid stream collection blades are designed to collect and momentarily hold and release fluid energy from any direction the fluid stream moves around the wheel, without the use of a collection funnel or housing. The flywheel is scaleable from about one foot in diameter to several hundred feet in diameter. The greater the wheel diameter is, the more efficient it becomes, by taking advantage of the centripetal force at the outer one third of the wheel where a very heavy mass is concentrated.

This very heavy mass at the outer edge also automatically stores and releases large amounts of kinetic energy, which stabilizes the speed and orientation of the wheel by using the gyroscopic precession effect. To further increase the wheel device efficiency and double its mechanical energy output for any given size wheel diameter, a special curved combination "wind" fluid stream energy blocker/wind direction rudder/fluid stream energy collection/redirection scoop element is used.

This extra element does multiple functions at once. First, it blocks all the wind fluid stream energy, that would normally impede the turbine blades and slow down the flywheel at its front outer leading edge. This extra element blocker/scoop device preferably is located outside the rotation of the torus wheel blades, extending downward and covering all the wheel blades from top to bottom. The portion of the device that is on top of half the blades acts as a wind direction rudder to center the front and rear collection diverter scoops to capture the maximum amount of fluid stream energy at the back and front of the flywheel, at the same time.

The special device is functional as a fluid stream energy diverter scoop which collects additional fluid stream energy from the front of the wheel and changes its direction from about 90 degrees to about 180 degrees at the back of the wheel which now directs fluid stream energy on a plurality of blades at the back side of the wheel. The extra fluid stream energy blocker/wind direction rudder/fluid stream energy collection/redirection scoop device is mounted on separate low friction bearing surfaces such as magnetic bearings or equivalent and rotates independently of the turbine flywheel and blades. This action increases the amount of fluid stream energy collected by collecting energy from both sides of the flywheel at the same time from any given wind fluid stream direction. The center of the wheel uses one vertical rotational axis post which may be sized from several inches in diameter to several feet in diameter, and from a number of feet tall to several hundred feet tall depending on the diameter of the wheel. The vertical rotational axis post may use several conventional oil lubricated bearings or very low friction bearings, for example, but not limited to, magnetic bearings located at various pivot points along the length of the vertical rotational axis post. Each pivot point may have a separate function with its own bearings, rotating in different directions at the same time around the rotational axis post. Below the flywheel at the lower end of the rotational axis post may be one or more mechanical power take-off points to accommodate one or more belt, chain, cog, gear, or similar drive functions which allow separate independent devices to operate at same time, for example, such as but not limited to, generators or pumps to be driven. Further, a direct drive mechanical power transfer sleeve coupling may be used to spin-up and drive an electrical energy generator.

This apparatus may also be adapted for use in hydroelectric applications, and indeed in any application requiring mechanical or electrical energy derived from fluid stream energy such as air/gas, or various types of moving fluids. The liquid type hydro devices are normally more efficient than air/gas devices due to the substance density and can be made smaller to achieve equivalent energy transfer.

According to the application, a medium size wind turbine wheel may be ten feet in diameter. The curved blade size extending from both sides of the torus wheel may be eight feet tall and four feet wide, which would be thirty-two square feet of collection surface area for each blade. A 10 foot diameter wheel with 20 blades would yield 640 square feet of blade collection surface area. The vertical rotational axis post for this size wheel may be fifteen feet tall and four inches in diameter, joined as by welding or the like to a one quarter inch or greater thickness bottom support plate which may be five feet square or larger to accommodate and dissipate the flywheel device weight.

Any one of several structures may be used to support the heavy toroidal outer mass of the flywheel. The horizontal turbine wheel can be made similar, for example, but not limited to a bicycle wheel with a plurality of tension separation spokes. In another structure, a thin solid round plate may be employed. In one preferred structure, a minimum of three triangle shaped beams (equal sides 3 or 4 inches) are required. The beams may be made of metal, carbon fiber, fiberglass or similar high strength materials and may be used to support the outer wheel.

To carry the weight of any turbine wheel and blades larger than about four feet in diameter generally requires for example, but not limited to, either:
multi-strand flexible stainless steel tension support cables on the top side of the flywheel,
or from the bottom side, heavy triangle support beams or similar flat beams attached to the inner edge of the flywheel and bottom rotational axis bearing at the support plate.

In one preferred example, top side multi-strand stainless steel tension cables are used. A number of multi-strand flexible stainless steel or equivalent support cables are required to be attached above each triangle beam used where the outer end of the support cable is attached to a top side of the wheel at the blades, and the other end of the support cable is attached to a turnbuckle, which is attached to the rotational axis post bearing. This allows precision tension adjustment to support the flywheel weight. Depending on the diameter of the wheel, and the weight carried, the support cable angle can vary.

The wind direction rudder/blocker/diverter scoop assembly, if used, may be attached to the top rotational axis post bearing disposed above the previously described wheel support cables bearing. If these top support cables are required, they can be made the same as lower wheel support cables. A minimum of three support cables are recommended to hold up the wind blocker/diverter scoop device, for example, but not limited to one at each end of the device and one at the top outer center of the device. In addition, a bottom triangular or equivalent support beam about three inches per side is attached to the bottom rotational axis bearing at the inner end. The outer end of the beam is attached to the center bottom of the wind blocker assembly wall.

While this assembly normally uses very light, strong materials to support its various functions, large wheels may require extra support at the outer blade area. One may utilize the support arrangement described for the flywheel support or equivalent. In exemplary embodiments, the fluid stream turbine is precision balanced to extend its useful service life and achieve greater efficiency.

Another immediate use for an exemplary embodiment configured in the light-weight tension separation spoke-wheel version is to retrofit—with the horizontal plane version—the existing broken three-bladed prop windmills littering the landscape from existing wind farms around the world. Using this horizontal wheel version is a simple low cost fix for the high (such as two hundred or so foot tall) tower generator units. It solves most problems, including mitigating bird kills, which has been a major environmental concern. It can increase electrical power output by a factor of two or three depending on the kind of generator used. This may be done by replacing long prop blades with a 200 foot or smaller diameter turbine wheel operating in the horizontal plane. This wheel may be smaller or the same diameter as the length of the prop blades removed.

Additional advantages over the three bladed prop units are that the wheel lays flat with reference to the ground, and it rotates in the horizontal plane and never changes elevation. In addition, the gyroscopic spinning effect stabilizes the entire unit. In contrast, with a three bladed prop windmill, each prop also has a very small surface area out at the tip where a large surface area is needed to fully capture and convert wind energy into mechanical energy.

To solve these problems, remove the three-bladed props, then install the horizontal wheel on top of the existing generator housing. This changes the prop to wheel orientation by 90 degrees. If the existing generator is still usable, just rotate the generator drive up from horizontal to vertical, and attach it to the wheel. This may double the electrical power generated in low wind conditions. To get even more efficiency and protect birds, bats, butterflies, the special wind blocker/wind direction rudder/diverter scoop device may be added to the top and outside of the wheel blades. If the existing generator is defective, remove and replace it with another device. If these steps are taken, all of the existing low efficiency outdated three-bladed prop generators can be given a second more productive life instead of being torn down and scrapped.

One more problem associated with current three-bladed props is bird, bat fatalities—the prop tip is so small and may be moving so fast that the birds, bats cannot see the prop; that is why they get killed. Also, the prop tips vary from 50 feet to 250 feet off the ground, covering a tremendous horizontal and vertical possible kill area for birds, bats flying from any direction. This apparatus has a very large surface area per blade for the birds, bats to see, which always stays at the same elevation from the ground, so the birds can avoid contact and butterflies too. In addition, the wind blocker device element if installed, will cover all the large collection blades, normally on the right hand side of one half of the wheel; therefore the birds, bats, butterflies are not even exposed to any moving blades on half the wheel. All the birds would hit is a 10 foot high wind blocker wall, either stationary or slowly moving back and forth several feet (to adjust for change in wind direction) blocker device element. Bird, bat, butterfly problem is now mostly solved, which should make environmentalists happy.

In exemplary embodiments, torus wheel tension support cables utilizing adjustable turnbuckles for precision tension adjustments, and/or wind blocker device tension support cables utilizing adjustable turnbuckles for precision tension adjustment, are provided. In exemplary embodiments, the flywheel is a lightweight wheel similar to a bicycle wheel that utilizes tension spokes which cross, difference is for this apparatus spoke wheel the tension spokes are straight with each other and never cross each other, or is a torus wheel cast or molded with heavy cast iron material for a solid one piece very heavy wheel, or is a torus wheel cast or molded with heavy poured in place steel reinforced concrete to achieve a continuous one piece very heavy wheel, or poured in factory. In exemplary embodiments, a wind or tidal turbine is scaleable from one foot in diameter to several hundred feet in diameter, the greater radial diameter the wheel is, the more efficient it becomes by taking advantage of the larger centripetal force created, utilizing very heavy wheel mass at the outer one third of the wheel, and the heavy mass wheel automatically stores and releases a large amount of mechanical energy while spinning, which stabilizes the speed and orientation of the wheel by using its precession effect.

An exemplary embodiment is illustrated in FIGS. 1-4. The exemplary fluid stream turbine includes a central axis post 1, which can be a vertical pole, for example, mounted to a base 2 fixed to the ground, for example. Alternatively, the central axis post 1 could be fixed to a moving structure, such as the roof of an automobile.

Rotatably mounted to the central axis post 1 is a flywheel. In the exemplary embodiment, the flywheel includes a central ring 3 rotatably supported by a first bearing 4 on the central axis post 1, an outer ring 5 supporting a plurality of curved blades 6, and a plurality of beams 7 extending radially between the central ring 3 and the outer ring 5. Although the flywheel of this embodiment is of a spoked wheel configuration, the flywheel supporting the blades 6 could have other configurations as discussed in detail above. The blades 6 are curved toward a direction opposite the intended direction of rotation. For example, in the view of FIG. 1, the blades 6 are curved in the counterclockwise direction, and the wheel is intended to spin clockwise.

Also rotatably mounted to the central axis post 1 is a housing including a curved side wall 8 configured to cover a portion of a radial periphery of the flywheel, a top wall 9 configured to cover a portion of a top side of the flywheel, and a rudder 10 disposed on the top wall 9 and configured to cause the housing to rotate such that a front of the housing always faces directly into a fluid stream. For example, in the orientation illustrated in FIG. 4, the direction of the fluid stream is from the bottom of the page to the top of the page. As illustrated in that figure, the rudder 10, which extends from a center of the top wall 9 to the back of the top wall 9, will orient the housing so that a front always faces the fluid stream. Furthermore, in this orientation, the curved side wall 9 blocks the fluid stream from impinging on the back (outwardly curved) surfaces of the blade 6. In this regard, such impingement would undesirably urge the flywheel to spin counterclockwise, which is opposite to the desired direction.

The housing also includes a first diverter scoop 11 disposed at the front of the housing and configured to direct a first portion of the fluid stream toward the plurality of blades 6, and a second diverter scoop 12 disposed at a rear of the housing and configured to direct a second portion of the fluid stream toward the plurality of blades 6. In the exemplary embodiment, the first diverter scoop 11 is positioned below the top wall 9 and directs a portion of the fluid stream that would have hit the back surfaces of the blades 6 absent the housing, toward front surfaces of the blades 6, as is evident from FIG. 4.

Figure 1:
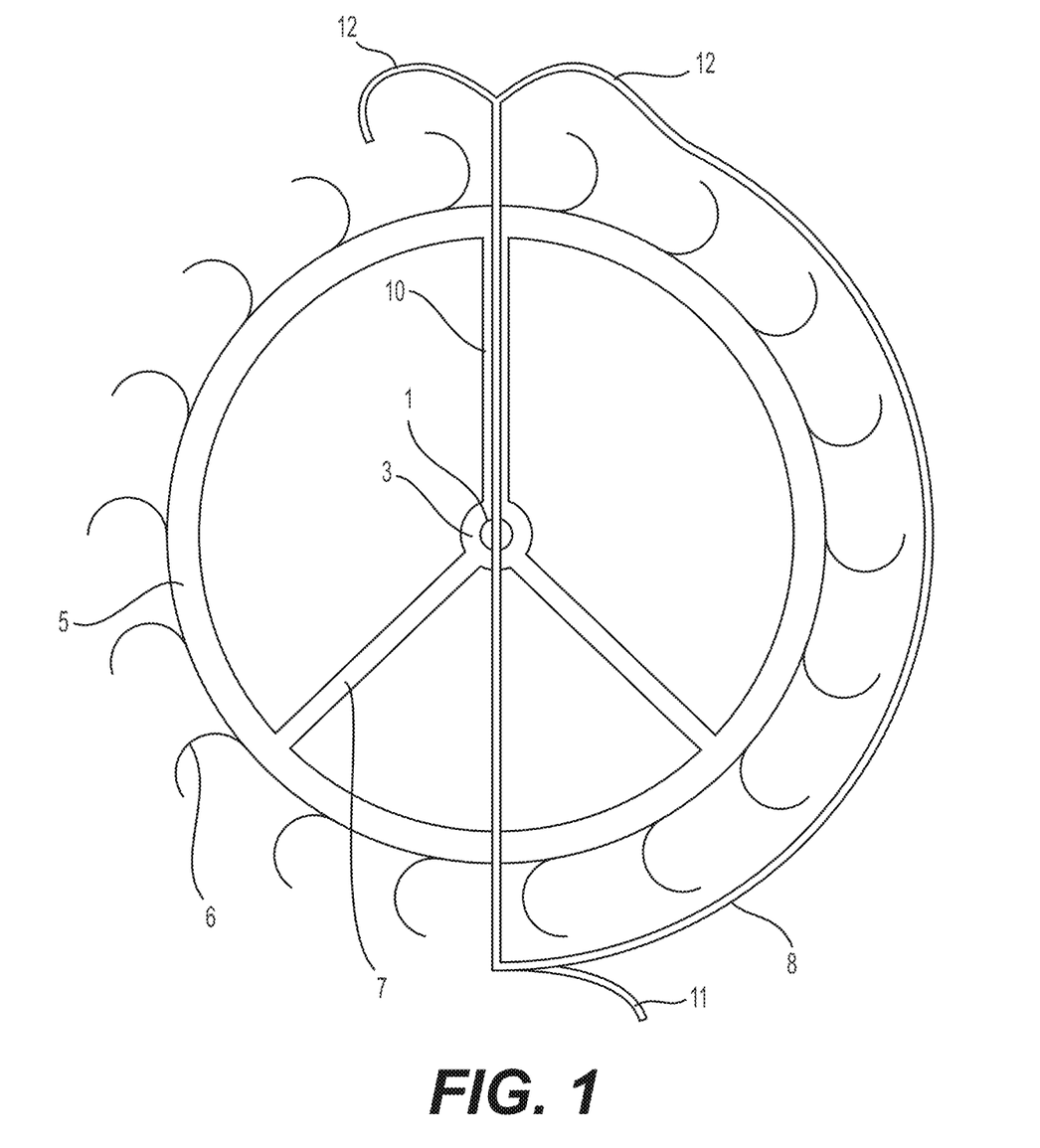
FIG. 1 is a cutaway top view of a fluid stream turbine according to exemplary embodiments of the present application.
Figure 2:
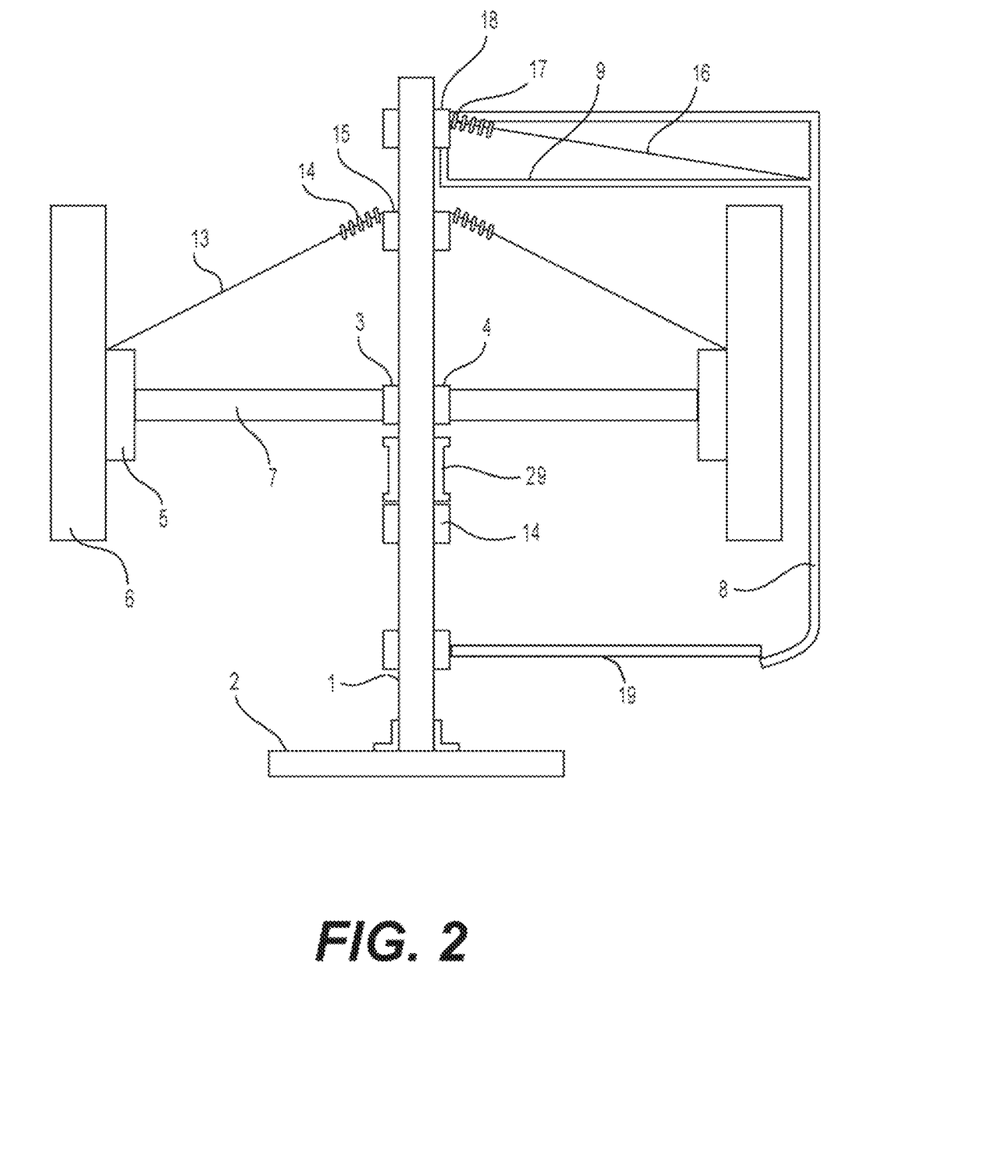
FIG. 2 is a cutaway side view of a fluid stream turbine according to exemplary embodiments of the present application.
Figure 3:
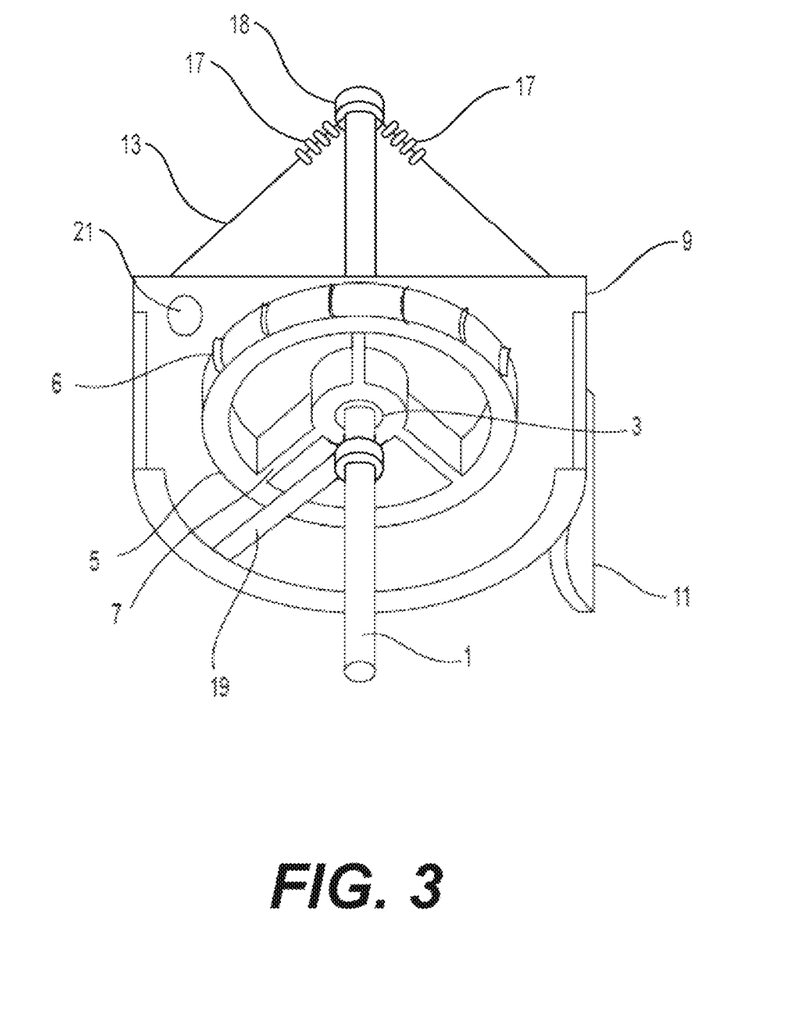
FIG. 3 is a perspective view of a fluid stream turbine according to exemplary embodiments of the present application.
Figure 4:
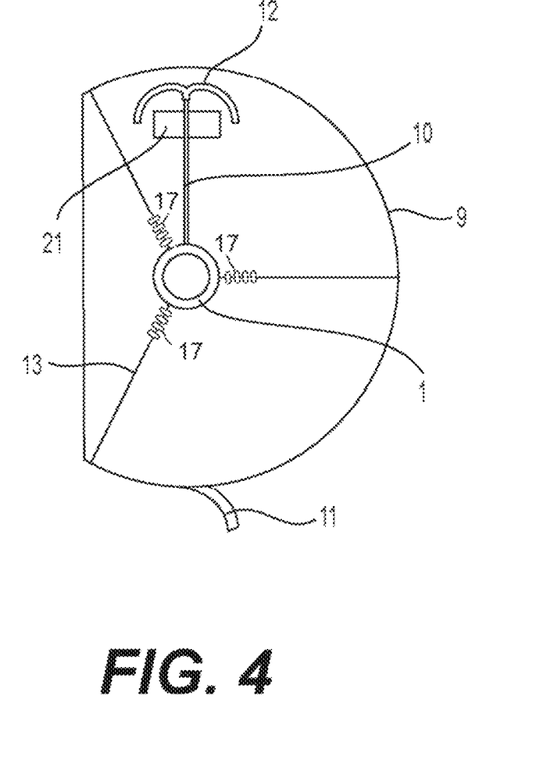
FIG. 4 is a top view of a fluid stream turbine according to exemplary embodiments of the present application.

In the exemplary embodiment, the second diverter scoop 12 is positioned above the top wall 9, behind the rudder 10, and is configured to direct a portion of the fluid stream that would otherwise pass over the blades 6 down through an opening 21 in the top wall 9 and towards the front of the blades 6. This configuration of the housing and its diverter scoops enables the energy of the fluid stream to be transferred to the flywheel at much higher efficiency, without the need for a funnel.

In the exemplary embodiment, additional support for the flywheel is provided by a plurality of first cables 13 each having a first end rotatably supported, via a first turnbuckle 14, by a second bearing 15 on the central axis post 1 above the first bearing 4, and a second end attached to and supporting the outer ring 5. Preferably, each cable 13 is disposed directly above a corresponding beam 7.

Additionally, the housing is supported by a plurality of second cables 16 each having a first end rotatably supported, via a second turnbuckle 17, by a third bearing 18 on the central axis post 1 above the second bearing 15, and a second end attached to and supporting the housing. Additional support for the housing is provided by a beam 19 that extends radially inward from the side wall 8, below the flywheel, and is rotatably supported by the central axis post 1 bearing.

A power take-off sleeve 29 disposed on the central axis post 1 between the first bearing 4 and a fourth bearing 20 is configured to rotate with the flywheel and transfer mechanical energy produced in the flywheel to other devices. For example, a generator can be provided at the power take-off sleeve to generate electrical energy, or a pump to pump liquid. Alternatively, for example, the mechanical energy can be transferred to another mechanical or electrical device via a chain driven by the power take-off sleeve. Of course, other arrangements for utilizing the mechanical energy of the power-take off sleeve could easily be envisioned by an ordinarily skilled artisan.

Figure 5:
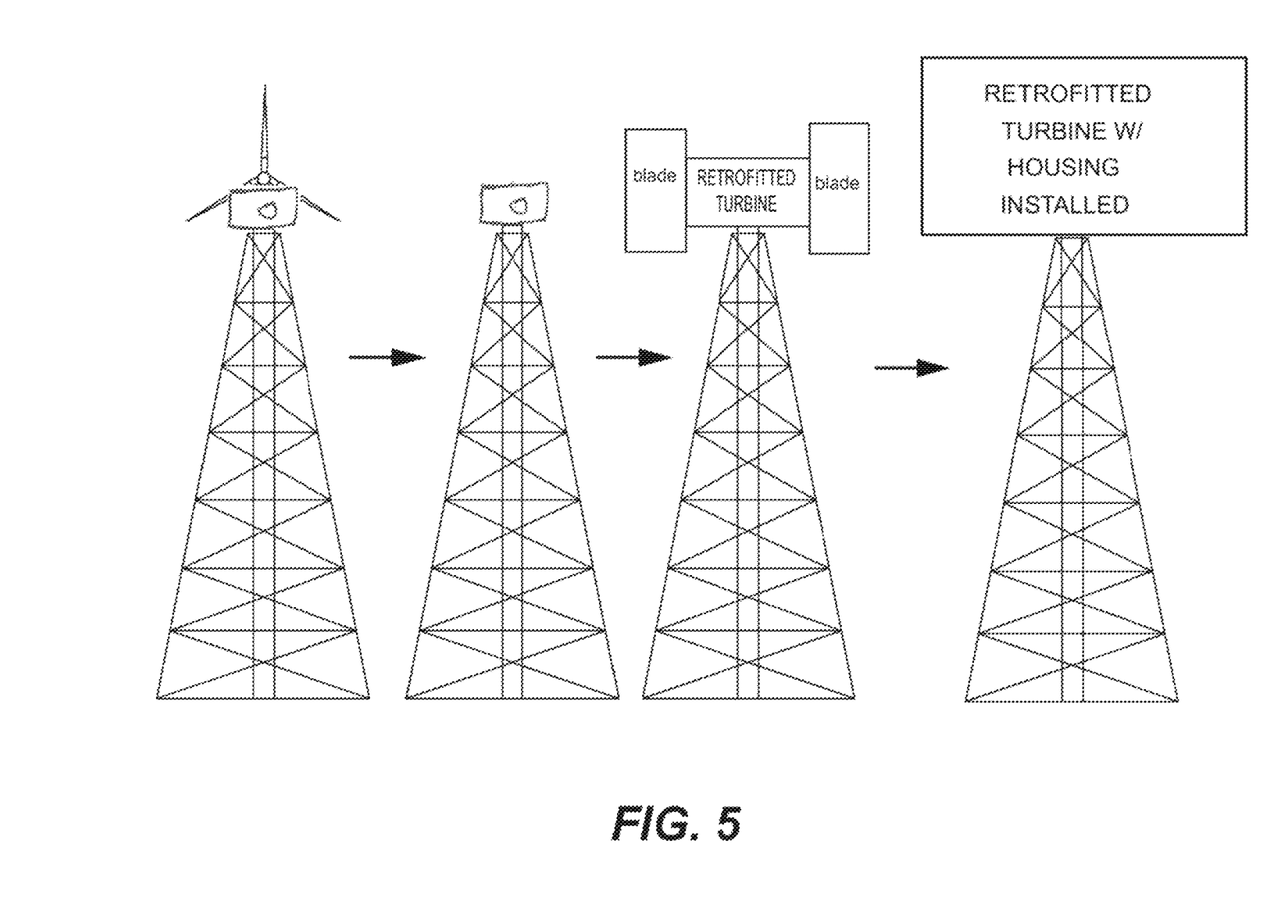
FIG. 5 is a schematic view of a fluid stream turbine retrofitted to a tower of an existing three bladed windmill.
Figure 6:
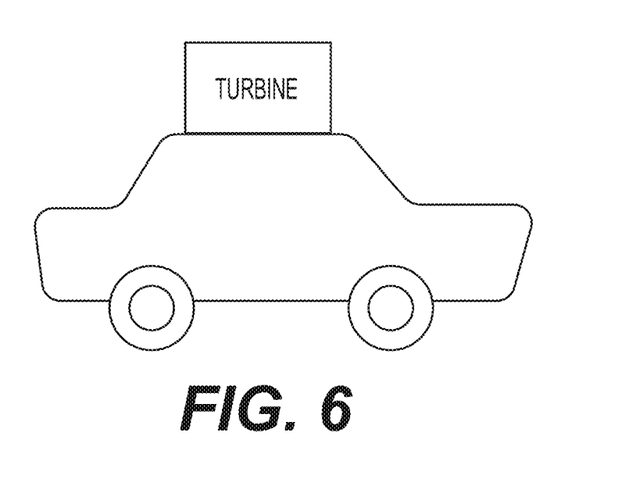
FIG. 6 is a schematic view of an automobile equipped with a fluid stream turbine.

As illustrated in the FIG. 5 schematic, retrofitting of fluid stream turbines as described above to a tower of an existing three bladed windmill can be performed simply by removing the three bladed windmill props, and installing the fluid stream turbine horizontal wheel so that it is operatively connected to the existing generator drive. Furthermore, fluid stream turbine as described above can be installed on a vehicle, such as an electric vehicle to, for example, charge the batteries while moving or stationary, as illustrated in the FIG. 6 schematic.

Figure 7:
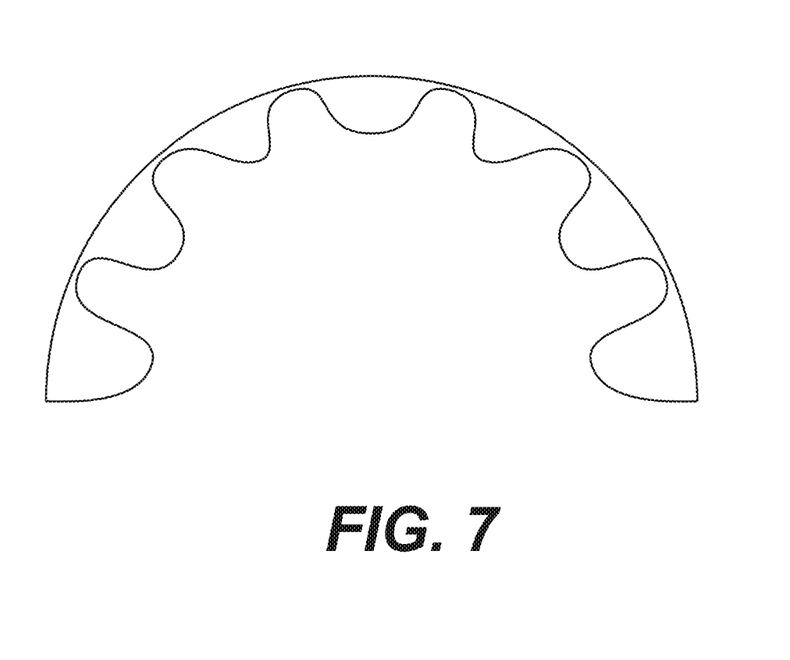
FIG. 7 is a top view of a corrugated inside protrusion surface of curved blade for increased efficiency with a fluid stream turbine.

FIG. 7 illustrates a top view of a corrugated blade design for use with fluid stream turbines as described above. By providing mini-corrugated protrusions only at the inside-curved collection surface area, which run the full length of the blade and increases blade surface area, the blades will collect and momentarily hold the fluid stream energy substance, which causes the wheel to absorb additional fluid stream energy which converts into mechanical energy causing the wheel to spin, with increased efficiency.

The detailed description above describes exemplary embodiments of fluid stream turbine assemblies. The invention is not limited, however, to the precise exemplary embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A fluid stream turbine comprising:
a central axis post;
a flywheel comprising a wheel and a plurality of blades which protrude from an outer surface of the wheel, the flywheel being rotatably mounted horizontally to the central axis post; and
a housing rotatably mounted to the central axis post, wherein the housing comprises:
a side wall configured to cover a portion of a radial periphery of the flywheel;
a top wall configured to cover a portion of a top side of the flywheel,
a rudder disposed on the top wall and configured to cause the housing to rotate such that a front of the housing always faces directly into a fluid stream;
a first diverter scoop disposed at the front of the housing and configured to direct a first portion of the fluid stream toward the plurality of blades; and
a second diverter scoop disposed at a rear of the housing and configured to direct a second portion of the fluid stream toward the plurality of blades at the same time.

2. The fluid stream turbine according to claim 1, wherein the plurality of blades are curved.

3. The fluids stream turbine according to claim 1, further comprising curved blades with mini corrugated protrusions only on the inner curved surface of each blade, extending the full blade length, which increases blade surface area and momentarily holds and releases additional fluid stream substance.

4. The fluid stream turbine according to claim 1, wherein the side curved wall is configured to block the fluid stream from directly contacting a back side of the plurality of blades.

5. The fluid stream turbine according to claim 1, wherein the first diverter scoop is configured to direct the first portion of the fluid stream toward the front side of the plurality of blades, at the front of the wheel.

6. The fluid stream turbine according to claim 1, wherein the second diverter scoop is configured to direct the second portion of the fluid stream toward front side of the plurality of blades, at the back side of the wheel.

7. The fluid stream turbine according to claim 1, further comprising an opening in the top wall of the housing, wherein the second diverter scoop is configured to direct the second portion of the fluid stream toward the plurality of blades through the opening, at the rear of the wheel top wall.

8. The fluid stream turbine according to claim 1, wherein the first diverter scoop is disposed below the top wall, at the front of the wheel.

9. The fluid stream turbine according to claim 1, wherein the second diverter scoop is disposed above the top wall, at the rear of the wheel.

10. The fluid stream turbine according to claim 1, further comprising a first bearing rotatably supporting the wheel on the central axis post.

11. The fluid stream turbine according to claim 10, wherein the wheel comprises a central ring supported by the first bearing, an outer ring supporting the blades, and a plurality of beams extending radially between the central ring and the outer ring.

12. The fluid stream turbine according to claim 11, further comprising a plurality of cables each having a first end rotatably supported, via a turnbuckle, by a second bearing on the central axis post above the first bearing, and a second end attached to and supporting the outer ring.

13. The fluid stream turbine according to claim 12, wherein each cable is disposed directly above a corresponding beam.

14. The fluid stream turbine according to claim 10, further comprising a plurality of cables each having a first end rotatably supported, via a turnbuckle, by a second bearing on the central axis post above the first bearing, and a second end attached to and supporting the wheel, at the blades.

15. The fluid stream turbine according to claim 10, further comprising a power take-off sleeve disposed on the central axis post below the first bearing, said power take-off sleeve configured to rotate with the flywheel and transfer mechanical energy produced in the flywheel to other devices.

16. The fluid stream turbine according to claim 10, further comprising a plurality of cables each having a first end rotatably supported, via a turnbuckle, by a second bearing on the central axis post above the first bearing, and a second end attached to and supporting the housing.

17. The fluid stream turbine according to claim 1, wherein the flywheel is configured to store and release mechanical energy.

18. The fluid stream turbine according to claim 1, wherein the fluid stream turbine is mounted to a moving vehicle.

19. The fluid stream turbine according to claim 1, wherein the flywheel and housing rotate on magnetic bearings or conventional oil bearings, independently of each other.

20. The fluid stream turbine according to claim 1, wherein the fluid stream turbine is supported structurally several feet to several hundred feet off the ground.

21. The fluid stream turbine according to claim 1, wherein the fluid stream turbine is configured to replace or retrofit a three bladed prop windmill.

22. The fluid stream turbine according to claim 1, wherein the fluid stream turbine is configured to protect birds, bats and other living things.

23. The fluid stream turbine according to claim 1, wherein the fluid stream turbine is precision balanced to extend its useful service life and achieve greater efficiency.

24. The fluid stream turbine according to claim 1, further comprising torus wheel tension support cables utilizing adjustable turnbuckles for precision tension adjustments.

25. The fluid stream turbine according to claim 1, further comprising wind blocker device tension support cables utilizing adjustable turnbuckles for precision tension adjustment.

26. The fluid stream turbine according to claim 1, wherein the flywheel is a lightweight wheel similar to a bicycle wheel that utilizes tension spokes which cross, difference is for this apparatus wheel the tension spokes are straight with each other and never cross each other.

27. The fluid stream turbine according to claim 1, wherein the flywheel is a torus wheel cast or molded with heavy cast iron material for a solid one piece very heavy wheel.

28. The fluid stream turbine according to claim 1, wherein the flywheel is a torus wheel cast or molded with heavy poured in place steel reinforced concrete to achieve a continuous one piece very heavy wheel, or poured in factory.

29. The fluid stream turbine according to claim 1, comprising a wind or tidal turbine scaleable from one foot in diameter to several hundred feet in diameter.

30. The fluid stream turbine according to claim 1, wherein the greater radial diameter the wheel is, the more efficient it becomes by taking advantage of the larger centripetal force created, utilizing very heavy wheel mass at the outer one third of the wheel.

31. The fluid stream turbine according to claim 1, wherein the heavy mass wheel automatically stores and releases a large amount of mechanical energy while spinning, which stabilizes the speed and orientation of the wheel by using its precession effect.

32. A method of converting fluid stream energy into mechanical energy, comprising:

providing a flywheel disposed alone, or within a housing, the flywheel comprising a wheel and a plurality of blades which protrude from an outer surface of the wheel;

causing the housing to rotate such that a front of the housing always faces directly into a fluid stream;

directing, by a first diverter scoop disposed at the front of the housing, a first portion of a fluid stream toward the plurality of blades; and directing, by a second diverter scoop disposed at a rear of the housing, a second portion of the fluid stream toward the plurality of blades.

33. The method according to claim 32, further comprising blocking the fluid stream from directly contacting a back side of the plurality of curved blades.

34. The method according to claim 32, further comprising transferring mechanical energy produced in the flywheel to other devices.

35. The method according to claim 32, further comprising protecting birds, bats, and other flying living things such as butterflies from being killed.

36. A fluid turbine assembly comprising:

a circular housing;

a torus wheel placed inside the housing and configured to rotate about a rotational axis, the wheel including a rotor and a plurality of blades which protrude from an outer surface of the rotor;

a diverter scoop assembly configured to compress fluid stream energy through a fluid top inlet opening; and an intake opening part of the top wall configured to direct the collected fluid stream energy down into the housing top and toward the wheel blades in a first direction, and to direct the front collected fluid stream energy into the housing and toward the turbine blades in a second direction opposite the first direction at the same time;

wherein the housing is configured to rotate on the same axis independently of the wheel blades, wherein the circular housing has a curved wall which separates the fluid stream energy coming in from opposite direction from the blades.

* * * * *